United States Patent
Erben et al.

(10) Patent No.: US 8,383,965 B2
(45) Date of Patent: Feb. 26, 2013

(54) TOP-PAN BALANCE WITH AN OVERLOAD SAFETY MECHANISM AND A CORNER LOAD SENSOR

(75) Inventors: Detlev Erben, Goettingen (DE); Helga Covic, Goettingen (DE); Jochen Doerner, Goettingen (DE)

(73) Assignee: Sartorius Weighing Technology GmbH, Goettingen (DE)

( * ) Notice: Subject to any disclaimer, the term of this patent is extended or adjusted under 35 U.S.C. 154(b) by 0 days.

(21) Appl. No.: 13/108,532

(22) Filed: May 16, 2011

(65) Prior Publication Data

US 2011/0278077 A1    Nov. 17, 2011

Related U.S. Application Data

(63) Continuation of application No. PCT/EP2009/008129, filed on Nov. 16, 2009.

(30) Foreign Application Priority Data

Dec. 17, 2008 (DE) .......................... 10 2008 062 742

(51) Int. Cl.
*G01G 21/24* (2006.01)
*G01G 23/02* (2006.01)

(52) U.S. Cl. ................. 177/184; 177/187; 177/210 EM; 177/212

(58) Field of Classification Search ............... 177/184, 177/187, 188, 189, 201 EM, 212, 229; 73/862.629–862.634, 862.637–862.639
See application file for complete search history.

(56) References Cited

U.S. PATENT DOCUMENTS

| | | | |
|---|---|---|---|
| 4,273,203 A | | 6/1981 | Blawert et al. |
| 5,082,073 A | | 1/1992 | Stadler et al. |
| 5,096,007 A | * | 3/1992 | Burkhard ........................ 177/187 |
| 5,191,948 A | * | 3/1993 | Strickler ........................ 177/187 |
| 5,604,334 A | | 2/1997 | Luechinger et al. |
| 5,721,398 A | | 2/1998 | Balsen et al. |
| 5,844,174 A | | 12/1998 | Kuhlmann et al. |
| 8,153,913 B2 | * | 4/2012 | Haefeli et al. ................. 177/229 |
| 2009/0114455 A1 | | 5/2009 | Mueller et al. |

FOREIGN PATENT DOCUMENTS

| | | |
|---|---|---|
| DE | 2830345 A1 | 2/1980 |
| DE | 3003862 A1 | 8/1981 |
| DE | 19511353 C1 | 7/1996 |
| DE | 10161517 A1 | 7/2003 |
| DE | 102006031950 B3 | 11/2007 |

\* cited by examiner

*Primary Examiner* — Randy W Gibson
(74) *Attorney, Agent, or Firm* — Sughrue Mion, PLLC

(57) ABSTRACT

A top-pan balance having a pan, a weighing system, and an overload safety mechanism. The load cell (4) of the weighing system is connected to fixed points (1) on a housing of the weighing system by an upper connecting rod (2) and a lower connecting rod (3) as a parallel guide so as to be movable in the vertical direction. The pan is attached to a pan support (8/9) for securing against overload, the support being connected to the load cell through an auxiliary parallel guide (15/16) and through a biased spring element (17/18), whereby the pan is quasi rigidly coupled to the load cell in the permissible weighing range, but is only resiliently coupled to the load cell when the permissible weighing range is exceeded. At least one limit stop is fixed to the housing and limits the elastic deflection of the pan and the pan support in case of overload. An additional corner load sensor is provided between the pan support and the load cell, and the corner load sensor and the overload safety mechanism form a common assembly (7), wherein the corner load sensor is disposed behind the overload safety mechanism in the force flow direction from the pan to the load cell. Furthermore, the assembly is attached on the side of the load cell facing the connecting rods and extends into the space between the connecting rods.

6 Claims, 3 Drawing Sheets

TOP-PAN BALANCE WITH AN OVERLOAD SAFETY MECHANISM AND A CORNER LOAD SENSOR

This is a Continuation of International Application PCT/EP2009/008129, with an international filing date of Nov. 16, 2009, which was published under PCT Article 21(2) in German, and which claims priority to German Patent Application No. 10 2008 062 742.9, with a filing date of Dec. 17, 2008. The entire disclosures of both applications are incorporated into this application by reference.

FIELD OF AND BACKGROUND OF THE INVENTION

The invention relates to a top-pan balance having a weighing pan, a weighing system, the load cell of which is connected to fixed points on the housing of the weighing system by an upper connecting rod and a lower connecting rod as a parallel guide so as to be movable in the vertical direction, and an overload safety mechanism. The weighing pan is attached to a pan support for securing against overload, the pan support being connected to the load cell through an auxiliary parallel guide and through a pre-tensioned spring element, whereby, in the permissible weighing range, the weighing pan is rigidly coupled to the load cell, and outside the permissible weighing range, is resiliently coupled to the load cell. At least one limit stop is fixed to the housing and limits the elastic deflection of the weighing pan and the pan support in case of overload.

Balances with overload safety mechanisms of this type are known, for example, from DE 28 30 345 A1 (U.S. Pat. No. 4,273,203). However, the embodiment described there takes up a substantial amount of space, so that the balance housing is made larger due to the overload safety mechanism. The overload safety mechanism also comprises a large number of parts, which makes assembly complex.

A significantly more compact embodiment made from fewer parts is known from DE 101 61 517 B4. This embodiment has proved to be successful.

OBJECTS AND SUMMARY OF THE INVENTION

It is an object of the invention to equip a balance of the aforementioned type with a further capability without necessarily increasing the structural volume of the weighing system.

According to one formulation of the invention, an additional corner load sensor is provided between the pan support and the load cell, the corner load sensor and the overload safety mechanism form a common assembly, wherein the corner load sensor is arranged behind the overload safety mechanism in the force flow direction from the weighing pan to the load cell, and the assembly is attached on the side of the load cell facing the connecting rods and extends into the space between the connecting rods.

Corner load sensors in balances are, in principle, already known. For example, DE 30 03 862 C2 discloses a corner load sensor with strain gauges on a vertical support element directly under the weighing pan. However, this corner load sensor must be dimensioned for the maximum overload that the balance is to withstand without damage. But this does not allow adequate corner load signals to be obtained from the strain gauges. The same applies for the corner load sensor in DE 10 2006 031 950 B3 (US 2009/0114455A1), which can be retrofitted between the weighing pan and the bottom pan of a balance.

In contrast thereto, in the combination according to the invention of corner load sensor and overload safety mechanism in a common assembly, the corner load sensor is arranged behind the overload safety mechanism, so that the corner load sensor is loaded no further than the response threshold of the overload safety mechanism. This means that the thin material sites of the corner load sensor can be made significantly thinner and the strain gauges applied can supply a significantly larger corner load signal.

DE 30 03 862 C2 also discloses—like DE 196 32 709 C1—that corner load sensors with strain gauges at the support sites of the connecting rods of the weighing system that are fixed to the housing detect the horizontal forces where the position of the weighed object is off-center. However, in order for such corner load sensors to be able to deliver a usable signal, the support sites of the connecting rods fixed to the housing must have a certain amount—if only very little—of resilience. However, this leads to a change in the geometry of the parallel guide and thus influences the corner load of the parallel guide. Here also, the problem arises that stable behavior of the parallel guide in the event of corner loading requires that the connecting rods have the most stable possible support points, whereas the desire for a sufficiently large output signal from the corner load sensors requires more resilient support points.

In contrast thereto, the corner load sensor provided, according to one aspect of the invention, together with the overload safety mechanism, between the pan support and the load cell does not influence the parallel guide of the weighing system in any way. The configuration of the parallel guide can be optimized without regard to the corner load sensor; and the corner load sensor can be dimensioned without regard to the parallel guide.

Since the common assembly made from corner load sensor and overload safety mechanism is fastened to the side of the load cell facing the connecting rods and extends into the region between the connecting rods, a particularly space-saving arrangement is produced. In this way, the outer dimensions of the weighing system are not changed by the overload safety mechanism and the corner load sensor.

In the case of weighing systems with a gearing lever, the lever is usually situated in the plane of symmetry of the weighing system. There is therefore only a little space available in the plane of symmetry. Advantageously therefore, the spring element of the overload safety mechanism is divided into two parts arranged on either side of the plane of symmetry. For example, the spring element may consist of two helical springs.

The corner load sensor advantageously consists of at least three vertically arranged thin material sites to which strain gauges are applied. The thin material sites are advantageously arranged in the force flow such that these sites are tension-loaded when the weighed object is placed approximately centrally on the weighing pan. Therefore, even with the weighed object arranged off-center (producing a corner load), the thin material sites experience only a relatively small bending load. If four thin material sites with strain gauges are used, arranged on the sides of a square, then a half bridge or full bridge can be connected for the X-direction and the Y-direction, respectively, and an output signal can be generated directly for the corner load in the X-direction and the Y-direction, respectively. The strain gauges can be most easily placed if they are positioned on the outside of the thin material sites.

Particularly good reproducibility of the corner load signals is achieved if the thin material sites are formed monolithically from a single component. This prevents slippage in the contact regions.

BRIEF DESCRIPTION OF THE DRAWINGS

The invention will now be described in greater detail with reference to the schematic drawings, in which.

DETAILED DESCRIPTION OF PREFERRED EMBODIMENTS

Figure 1:
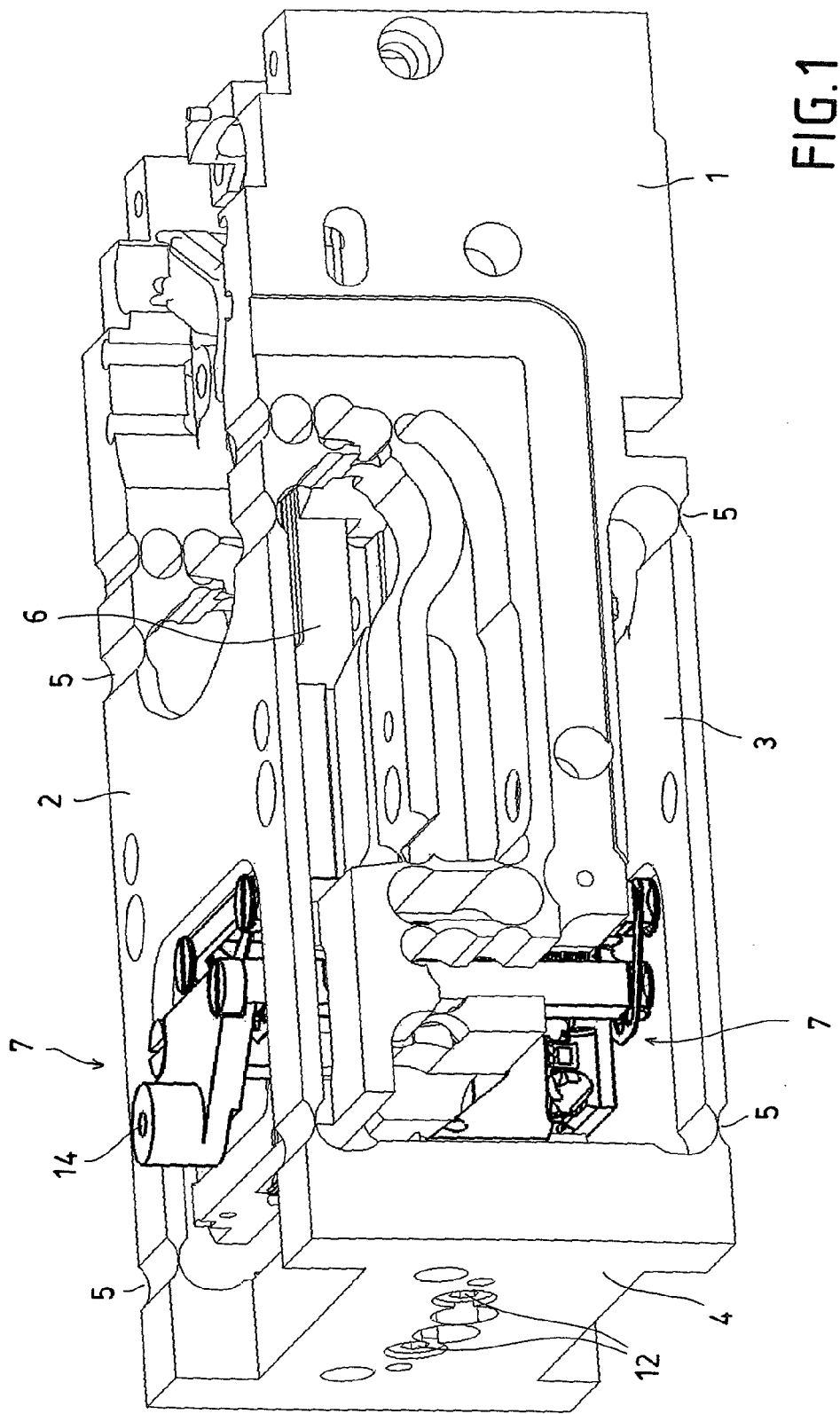
FIG. 1 shows the weighing system in a perspective view.

The weighing system of FIG. 1 functions according to the principle of electromagnetic force compensation and comprises a connecting rod parallel guide and a multiplier lever. Mounted on a region 1 fixed to the housing are an upper connecting rod 2 and a lower connecting rod 3 which together guide a load cell 4 movably in the vertical direction. The thin material sites which act as hinges are indicated at reference numeral 5. The force to be measured is transmitted via a coupling element (not shown) and a multiplier lever 6 (of which only a small part is shown) to a coil (not shown) which extends into a permanent magnet system (also not shown). The parts 1 . . . 6 are formed monolithically from a single block of material. Weighing systems of this type are generally known and therefore do not need to be described in detail here. Specifically the assembly 7, with the corner load sensor and the overload safety mechanism, which is emphasized in FIG. 1 with a thicker outline and is shown again alone and enlarged in FIG. 2, embodies the invention.

The assembly 7 essentially consists of the pan support 8/9, which is constructed from the pan support upper part 8 and the pan support lower part 9 and the corner load sensor part 10. The pan support lower part 9 is shown again alone in FIG. 4 for clarity, and similarly the corner load sensor part 10 is shown again alone in FIG. 3.

The corner load sensor part 10 of the assembly 7 is firmly fixed to the load cell 4 of the weighing system by screws 12 (FIG. 1) and threaded holes 13. The pan support upper part 8 supports the weighing pan (not shown) of the balance at the bore 14. Situated on the pan support lower part 9 is an extension arm 9' to which a hook for suspended weighing can be attached. The pan support 8/9 and the corner load sensor part 10 are connected to one another via two spring plates 15 and 16 in the form of an auxiliary parallel guide and via two pre-tensioned helical springs 17 and 18. The helical springs 17 and 18 are hooked onto a projecting hook 19 on the pan support lower part 9 and onto a projecting hook 20 on the corner load sensor part 10. The helical springs therefore pull the scale pan lower part 9 upwardly and the corner load sensor part 10 downwardly, so that the underside 21 of the projecting hook 20 is pressed against the stop 11 on the pan support lower part 9. The pre-tensioning force of the helical springs is large enough such that the contact force against the stop is approximately 150% of the nominal load of the balance. Up to this threshold value, the pan support 8/9 and the corner load sensor part 10 are semi-rigidly coupled to one another, so that the weight force of the weighed object is transmitted via the weighing pan, the pan support 8/9 and the corner load sensor part 10 1:1 to the load cell 4 of the weighing system. Only in the event that the threshold value is exceeded is the pre-tensioning force of the helical springs 17 and 18 no longer sufficient. Given a more than 50% overload, the stop 11 lifts off the projecting hook 20, the pan support 8/9 sinks further, whilst the corner load sensor part 10, and therefore also the load cell 4, do not move therewith. The descent of the pan support 8/9 and of the weighing pan is stopped by a limit stop (not shown) which is suitably arranged directly between the weighing pan and the housing of the balance and transmits relatively large overloads directly from the pan to the housing. Therefore, in the event of an overload, only slightly more than the threshold value is transmitted to the weighing system and the weighing system is effectively protected against overload. By virtue of the auxiliary parallel guide made from the spring plates 15 and 16, the response threshold of the overload safety mechanism is independent of the location of the overload on the weighing pan. Even when the hook is used for suspended weighing on the extension arm 9', the overload safety mechanism remains operational, and also if a suitable limit stop is provided on the extension arm 9' or on the pan support lower part 9.

Figure 2:
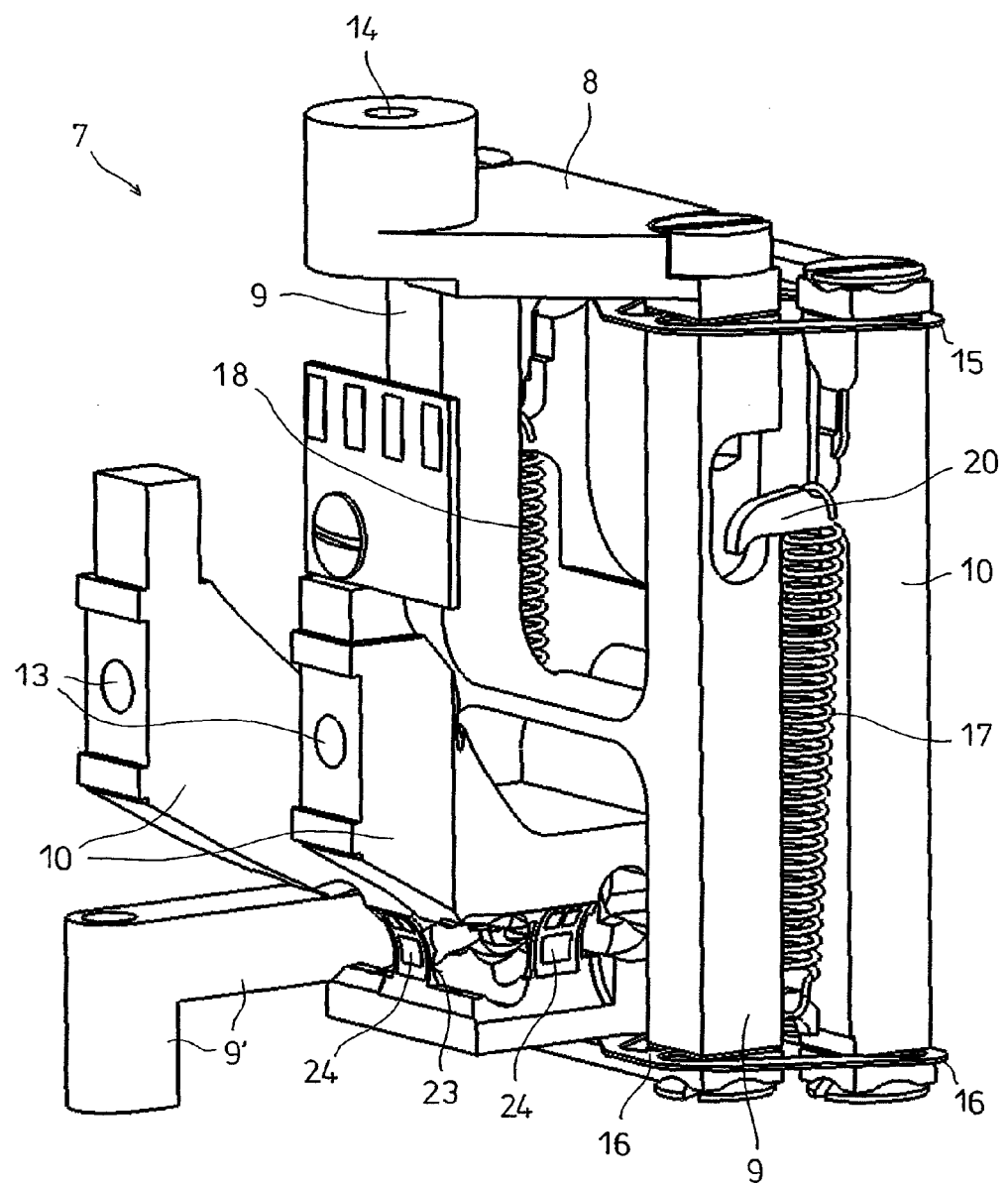
FIG. 2 shows the assembly with corner load sensor and overload safety mechanism.
Figure 3:
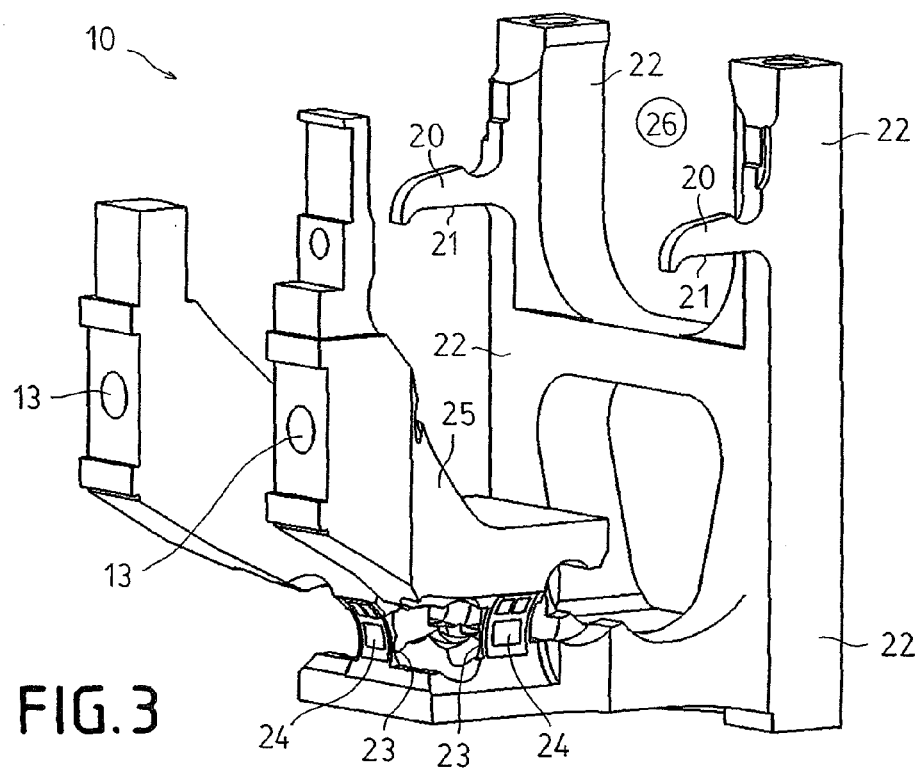
FIG. 3 shows the corner load sensor alone.
Figure 4:
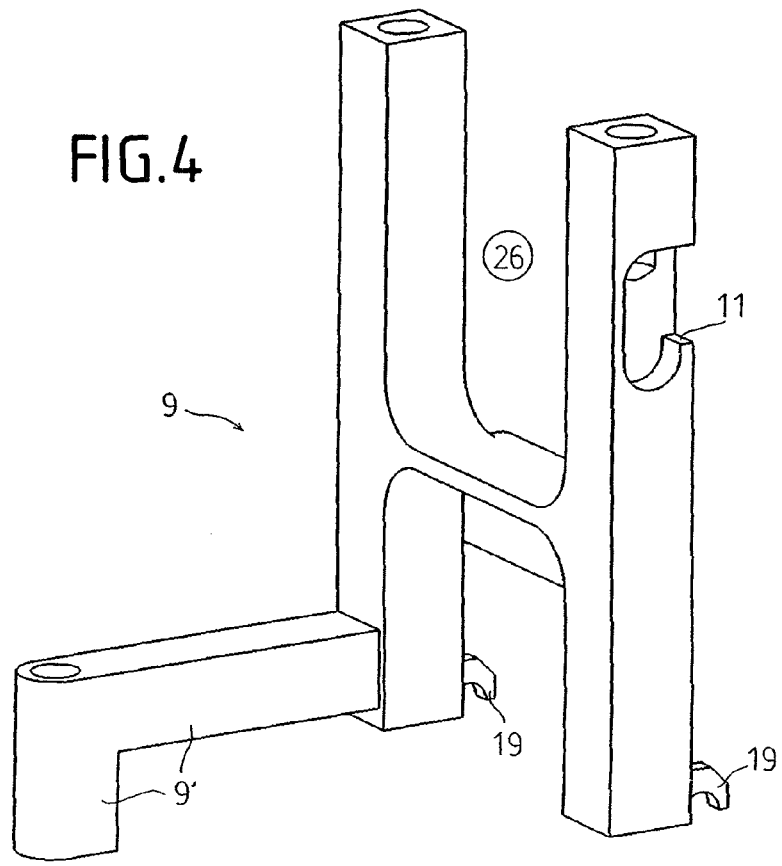
FIG. 4 shows the pan support lower part alone.

The operation of the assembly 7 as a corner load sensor is realized in the corner load sensor part 10, as shown in FIG. 3. The forces transmitted from the weighed object on the weighing pan, including the torques caused by an off-center position of the goods being weighed, are transmitted through the pan support lower part, via the two projecting hooks 20 and the spring plates 15, 16 to the approximately H-shaped rear part 22 of the corner load sensor part 10. From this rear part 22, the forces and torques are transmitted via four vertically oriented thin material sites 23 with strain gauges 24 applied, to the front part 25 of the corner load sensor part 10 and therefrom via the screw connection 12/13 to the load cell 4 of the weighing system. In FIGS. 2 and 3, only two thin material sites 23 are shown, the others lying symmetrically thereto, specifically such that the four thin material sites 23, seen in plan view, are positioned on the sides of a square. The weight force of the weighed object put the four thin material sites essentially under tensional load and therefore generates a common mode signal at the strain gauges, whereas with an off-center position, the torques lead to a difference signal at the two respectively opposite strain gauges. This difference signal can then be separated from the common mode signal in a Wheatstone Bridge circuit, in known manner, and an output signal is obtained from the corner load sensor for the X-direction and the Y-direction, respectively. This corner load sensor signal can then be used in known manner, together with the stored corner load correction factors, to calculate a correction value in the electronics of the balance. With the arrangement of the four thin material sites at the sides of a square (seen in plan view), the sensitivity with regard to corner load torques in the X and Y-directions is equal, with the result that the mathematical evaluation is simple. The overall corner load sensor part 10 is machined monolithically from a single block of metal. In this way, distortions during assembly of the individual parts and slipping effects at connection sites are prevented, with the result that the corner load signals have a high degree of reproducibility.

With the arrangement described, the corner load sensor is situated behind the overload safety mechanism, seen in the force flow direction from the weighing pan to the load cell. In this way, overload forces do not reach the thin material sites 23 of the corner load sensor, so that the thin material sites do not have to be dimensioned for overload forces. This means that the thin material sites can be made thinner and the strain gauges emit a larger signal. The same applies given the presence of a plurality of correctly oriented overload limit stops, including for overload torques.

In the advantageous embodiment of the balance shown, four thin material sites 23 are provided with strain gauges for the corner load sensor. This results in the possibility of particularly simple electronic evaluation of the strain gauge signals. Naturally, three thin material sites 23 with strain gauges also suffice in order to obtain the corner load signals in the X and Y-directions. The three thin material sites must then be arranged, for example, on the sides of an equilateral triangle. Each strain gauge would have to have a fixed resistor added to make a half-bridge and thus be evaluated. The X and Y-corner signals would then have to be calculated from the three signals using known mathematical operations.

As FIG. 1 shows, the assembly is screwed onto the side of the load cell 4 facing the connecting rods and extends into the space between the connecting rods 2 and 3. The assembly 7 therefore needs no additional space in the balance housing. In order to be able to guide the multiplier lever 6 located in the plane of symmetry of the weighing system through the assembly 7, the pan support lower part 9 and the corner load sensor part 10, each has a free space 26. For the same reason, two helical springs 17 and 18 are provided, arranged at the sides of the assembly 7.

The above description of the preferred embodiments has been given by way of example. From the disclosure given, those skilled in the art will not only understand the present invention and its attendant advantages, but will also find apparent various changes and modifications to the structures disclosed. The applicant seeks, therefore, to cover all such changes and modifications as fall within the spirit and scope of the invention, as defined by the appended claims, and equivalents thereof.

The invention claimed is:

1. A top-pan balance comprising:
   a weighing pan attached to a pan support; and
   a weighing system, comprising:
   a housing defining fixed points,
   a load cell connected to the fixed points on the housing of the weighing system by an upper connecting rod and a lower connecting rod configured as a parallel guide to move in a vertical direction, and
   an overload safety mechanism,
   wherein the pan support is configured to secure the load cell against overload, and is connected to the load cell through an auxiliary parallel guide and through a pre-tensioned spring element, such that the weighing pan is rigidly coupled to the load cell in a permissible weight range and is resiliently coupled to the load cell in an excessive weight range that exceeds the permissible weight range,
   wherein at least one limit stop is fixed to the housing and limits the elastic deflection of the weighing pan and the pan support in case of overload,
   the weighing system further comprising a corner load sensor between the pan support and the load cell,
   wherein the corner load sensor and the overload safety mechanism form a common assembly,
   wherein the corner load sensor is arranged, with respect to a weighing force flow direction from the weighing pan to the load cell, behind the overload safety mechanism, and
   wherein the common assembly is attached on a side of the load cell that faces the connecting rods and extends into a space situated between the connecting rods.

2. The balance as claimed in claim 1, wherein the pre-tensioned spring element comprises two pre-tensioned helical springs respectively situated on opposing sides of a vertical plane of symmetry of the weighing system.

3. The balance as claimed in claim 1, wherein the corner load sensor comprises three vertically arranged thin material sites provided with respective strain gauges.

4. The balance as claimed in claim 3, wherein the corner load sensor consists essentially of four vertically arranged thin material sites together forming sides of a square, and wherein the strain gauges are respectively arranged on outward-facing surfaces of the thin material sites.

5. The balance as claimed in claim 3, wherein the thin material sites of the corner load sensor and material regions adjoining and interconnecting the thin material sites are formed monolithically from a single block of material.

6. A weighing system for a balance, comprising:
   a weighing pan support;
   a load cell configured to connect to a weighing system housing with an upper connecting rod and a lower connecting rod configured as a parallel guide for vertical displacement, and
   an assembly comprising an overload mechanism and a corner load sensor,
   wherein an auxiliary, spring-loaded guide interconnects the weighing pan support and the overload mechanism, such that the weighing pan support and the load cell form a non-resilient coupling in a first weight range and form a resilient coupling in a second weight range that is greater than the first weight range,
   wherein the overload mechanism comprises at least one limit stop configured to prevent displacement of the weighing pan support relative to the load cell beyond a given deflection limit,
   wherein the corner load sensor is coupled into the non-resilient coupling in the first weight range,
   wherein the overload mechanism provides the resilient coupling in the second weight range,
   wherein the assembly is arranged at least mostly in an internal space of the load cell located between the connecting rods, and
   wherein the corner load sensor is arranged between the weighing pan support and the load cell.

* * * * *